G. W. DAVIS.
PAPER FEEDING MECHANISM FOR TYPE WRITERS.
APPLICATION FILED SEPT. 21, 1910.
1,034,984.
Patented Aug. 6, 1912.
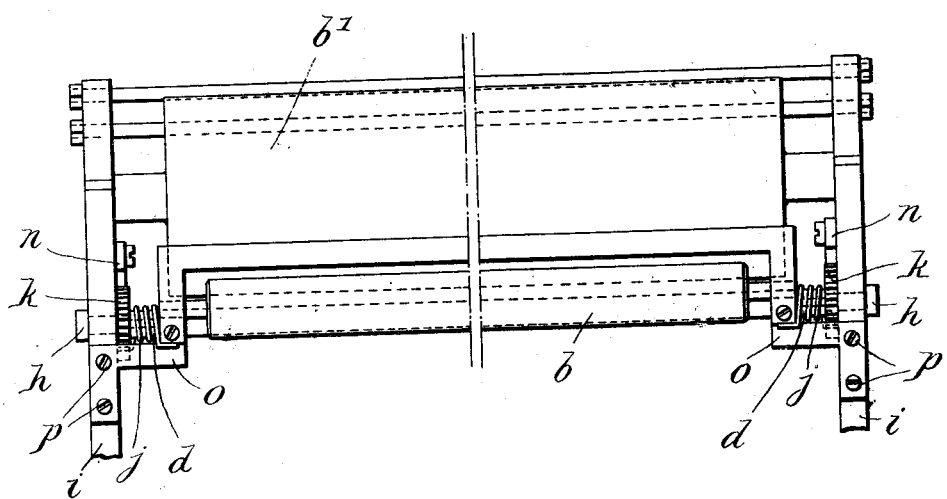
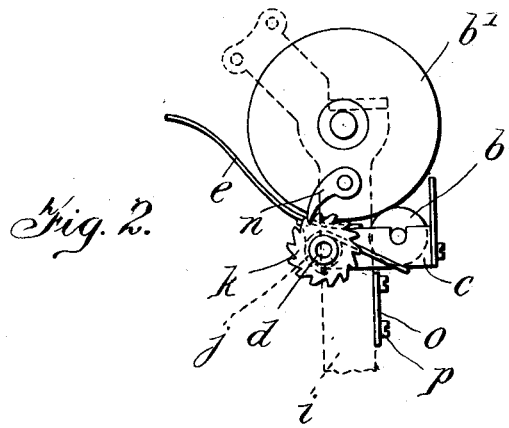
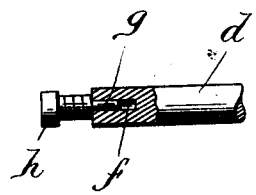

UNITED STATES PATENT OFFICE.

GEORGE WILLIAM DAVIS, OF WESTMOUNT, QUEBEC, CANADA.

PAPER-FEEDING MECHANISM FOR TYPE-WRITERS.

1,034,984. Specification of Letters Patent. Patented Aug. 6, 1912.

Original application filed January 3, 1907, Serial No. 350,636. Divided and this application filed September 21, 1910. Serial No. 583,092.

*To all whom it may concern:*

Be it known that I, GEORGE WILLIAM DAVIS, of Westmount, Province of Quebec, Canada, have invented certain new and useful Improvements in Paper-Feeding Mechanism for Type-Writers; and I do hereby declare that the following is a full, clear, and exact description of the same.

My invention may be said to consist of the particular combination and arrangement of parts hereinafter described and pointed out in the claims.

For full comprehension, however of my invention reference must be had to the accompanying drawings forming a part of this specification in which similar reference characters indicate the same parts and wherein:

Figure 1 is a rear view of the vibratory carriage the platen and presser roll with my invention applied thereto; Fig. 2 is an end view thereof with some of the parts removed; and Fig. 3 illustrates in part sectional view the end of one of the shafts of the presser roll supporting means.

The object of my invention is to provide easily adjustable means for imparting a uniform feeding action to the paper of a typewriting machine and may be said to consist of the combination and arrangement of parts hereinafter described and pointed out in the claims.

In connection with the platen of all visible writing machines a device is used for pressing the paper upon the platen roll for the purpose of enabling the latter when rotated to shift the paper. The defects in these devices have been that the paper is not fed uniformly and such devices have been difficult to adjust when displaced. In order to overcome these defects the presser roll $b$ is rotatively mounted beneath and held against displacement by the platen roll $b'$ in a pair of slotted bearings $c$ which are in turn mounted rigidly upon a shaft $d$ and present rearward extensions upon which the paper table $e$ is supported. The ends of the shaft $d$ are mortised as at $f$ to receive tenons $g$ upon the ends of screws $h$ screwed into and projecting through the end frames of the vibratory carriage. A pair of expansile coiled springs $j$ (one at each end of the shaft) encircle the end portions of this shaft between the bearings $d$ and a pair of ratchet wheels $k$ mounted loosely upon each end of such shaft and bearing against the end frames of the vibratory carriage. One end of each spring is connected to one of the ratchet wheels and the opposite end thereof is carried to a point beyond the axial line of the presser roll where they are bent beneath the bearings $c$ thus causing the presser roll to yieldingly bear upon the platen $b'$ while a pair of gravity pawls $n$, mounted upon the end frames of the vibratory carriage, retain the ratchet wheels $k$ against rotation in one direction, and angular stops $o$ are fastened as at $p$ to the end frames $i$ of the vibratory carriage and extend inwardly there from limiting the movement of the bearings away from the platen roll.

The tension with which the presser roll bears upon the platen roll is adjustable by rotating the ratchet wheels $k$ in one direction or the other which either tightens or loosens the spring $j$ and thereby causes the presser roll to bear tightly or loosely against the platen, when the paper is fed faster at one end of the platen than at the other it is because that end is in tighter contact with the platen than the other, and it can be rectified by loosening the spring at that end.

This application is a division of Serial No. 350,636, filed January 3, 1907.

What I claim is as follows:—

1. In a typewriter the combination with a vibratory carriage, a platen roll mounted in the said carriage and a presser roll,—of a pair of bearings for the ends of the presser roll; a shaft pivotally mounted in the vibratory carriage and supporting the said bearings adjacent to their rear ends; an expansile coiled spring at each end of the said shaft, encircling the same and extending beneath the presser roll to a point beyond the axial line thereof where they yieldingly support the said bearings independently of each other; ratchet and pawl mechanism for varying the tension of the said springs, and stops for limiting the movement of the bearings away from the platen.

2. In a typewriter, the combination with a vibratory carriage, a platen roll mounted in the said carriage and a presser roll,—of a pair of bearings for the ends of the presser roll, a shaft pivotally mounted in the vibratory carriage and supporting the rear ends of the said bearings, an expansile coiled spring encircling each end of the said shaft and yieldingly supporting the said bearings independently of each other, a pair of ratchets mounted loosely upon the opposite ends of the beforementioned shaft and having the springs fastened thereto, a pair of gravity pawls fastened to the vibratory carriage and adapted to retain the said ratchets against rotation in one direction and angular stops fastened to the vibratory carriage for limiting the movement of the bearings away from the platen roll.

In testimony whereof, I have signed my name to this specification, in the presence of two subscribing witnesses.

GEORGE WILLIAM DAVIS.

Witnesses:
CHS. OSBORNE,
RAOUL HAMELIN.

Copies of this patent may be obtained for five cents each, by addressing the "Commissioner of Patents Washington, D. C."